(12) United States Patent
Kunimori et al.

(10) Patent No.: US 7,852,440 B2
(45) Date of Patent: Dec. 14, 2010

(54) LIQUID CRYSTAL DISPLAY DEVICE

(75) Inventors: Takashi Kunimori, Tottori (JP); Yutaka Sano, Tottori (JP); Masanori Yasumori, Tottori (JP); Yukiya Hirabayashi, Suwa (JP); Yasushi Yamazaki, Chino (JP)

(73) Assignee: Sony corporation, Tokyo (JP)

( * ) Notice: Subject to any disclaimer, the term of this patent is extended or adjusted under 35 U.S.C. 154(b) by 825 days.

(21) Appl. No.: 11/775,520

(22) Filed: Jul. 10, 2007

(65) Prior Publication Data

US 2008/0049004 A1    Feb. 28, 2008

(30) Foreign Application Priority Data

Jul. 12, 2006  (JP) ............... 2006-191096
Nov. 27, 2006  (JP) ............... 2006-318105
Mar. 20, 2007  (JP) ............... 2007-071978

(51) Int. Cl.
    *G02F 1/133*    (2006.01)
(52) U.S. Cl. .................................... 349/116
(58) Field of Classification Search .................. 349/116
    See application file for complete search history.

(56) References Cited

U.S. PATENT DOCUMENTS

| | | | |
|---|---|---|---|
| 4,760,389 A | 7/1988 | Aoki et al. | |
| 6,087,648 A | 7/2000 | Zhang et al. | |
| 2007/0171157 A1* | 7/2007 | Choi et al. | 345/81 |
| 2009/0122039 A1* | 5/2009 | Katoh et al. | 345/207 |
| 2009/0135115 A1* | 5/2009 | Sakamoto et al. | 345/84 |

FOREIGN PATENT DOCUMENTS

| | | | |
|---|---|---|---|
| JP | 62-125329 A | 6/1987 |
| JP | 1-143257 A | 6/1989 |
| JP | 5-95100 A | 4/1993 |
| JP | 11-024105 A | 1/1999 |
| JP | 11-84426 A | 3/1999 |
| JP | 2000-122575 A | 4/2000 |
| JP | 2002-131719 A | 5/2002 |
| WO | 2006/118044 A1 | 11/2006 |
| WO | 2006/118066 A1 | 11/2006 |

* cited by examiner

*Primary Examiner*—Uyen-Chau N Le
*Assistant Examiner*—Chris H Chu
(74) *Attorney, Agent, or Firm*—K&L Gates LLP

(57) ABSTRACT

A liquid crystal display device of the invention has: a display panel with an active matrix substrate 2 and a second substrate of transparent material deposed opposite that substrate; an illuminating unit that illuminates the display panel; and a photosensing unit that is provided on the active matrix substrate and has an ambient light photosensor that senses external light. The ambient light photosensor is constituted of a thin film transistor. At least the source electrode $S_L$ and drain electrode $D_L$ of the thin film transistor are covered by a shielding transparent electrode 6, with transparent insulator 3 and 5 interposed. The transparent electrode 6 is electrically connected to the drain electrode $D_L$, and moreover is connected to a power source supplying constant voltage. Thanks to such structure, a display device is provided in which the ambient light photosensor is built into a panel substrate so as not to be affected by external noise and the peripheral circuits.

17 Claims, 12 Drawing Sheets

TFT AMBIENT LIGHT PHOTOSENSOR

READING

LIQUID CRYSTAL DISPLAY DEVICE

BACKGROUND

1. Technical Field

The present invention relates to a liquid crystal display device, and more particularly to a liquid crystal display device in which an ambient light photosensor that senses external light is built into the liquid crystal display panel.

2. Related Art

Recent years have seen thin-type display panels come into use in telecommunications equipment and electronic equipment in general. Among such panels, liquid crystal display panels are the most widely used. In liquid crystal display panels the liquid crystals are non light-emitting, which means that the images displayed are hard to see in dark places. Therefore these panels are provided with a backlight or sidelight ("backlight" below), and when the external light is dim, the backlight is lit in order to render visible the images displayed.

However, with manual control one must perform manipulations to turn the backlight on or off according to the brightness of the external light. Such manipulations are bothersome, and furthermore when it is bright one sometimes ends up turning the backlight on unnecessarily, which wastefully increases the power consumption and, where the display is used in a mobile telephone or similar equipment, could cause the battery to run down quickly.

Accordingly, in order to eliminate such inconvenience, technology has been developed whereby an ambient light photosensor is built into the liquid crystal display panel, the brightness of the external light is sensed by the ambient light photosensor, and on/off switching of the backlight is controlled according to the sensing results (see JP-A-2002-131719, JP-A-2000-122575 and JP-A-11-84426).

For instance, the liquid crystal display device set forth in JP-A-2002-131719 uses as the ambient light photosensor a thin film transistor (TFT), which is fabricated simultaneously with the TFTs used as the liquid crystal display panel's switching elements, while the liquid crystal display device set forth in JP-A-2000-122575 deploys an external light illuminance sensor and a backlight illuminance sensor on the panel circuit board, controlling the backlight according to the results of sensing by both sensors, and furthermore the liquid crystal display device set forth in JP-A-11-84426 deploys the ambient light photosensor in a place distanced from the drive circuits around the liquid crystal's periphery and from the external terminals, so that the sensor is not affected by high frequency noise generated by, or heat emitted from, those drive circuits, etc.

The TFT ambient light photosensor has the characteristic that when no light is shining on it a slight leakage current (dark current) flows in its gate-OFF region, and when light shines on it a current (leakage current) flows that is of size corresponding to the intensity (brightness) of the light. Since the TFT ambient light photosensor utilizes this leakage current to sense the brightness of the external light, and the leakage current is extremely feeble, the output from the TFT ambient light photosensor is susceptible to the influence of external noise.

Therefore, if the aforesaid ambient light photosensor is built into one of the liquid crystal display panel's substrates, for example into the active matrix substrate (also called the array substrate), then since there are peripheral drive circuits for driving the liquid crystal, as well as external terminals, etc., deployed on the active matrix substrate, high-frequency signals and heat emissions, etc., from such circuits, etc., may affect the sensor. To counter this, the liquid crystal display device of JP-A-11-84426 places the ambient light photosensor in a location distanced from the peripheral drive circuits and external terminals that generate high-frequency signals and heat emissions, so that it is not affected by such noise. However, there are lead-out lines, including at least a power line and an output line, coupled to the TFT ambient light photosensor, and these lead-out lines are passed around the periphery of the display section. Consequently these lead lines, particularly the output line, will be susceptible to the influence of external noise. Moreover, since parasitic capacitance is generated between the output line and the common electrode on the opposed substrate, there is danger that the output line will be affected by the common electrode voltage (below, "VCOM voltage") that is applied to the common electrode. Also, the ambient light photosensor may be directly affected by the VCOM voltage.

Ambient light photosensors of this kind are known in which, because of the susceptibility to external noise, electrostatic shielding film is provided on the active matrix substrate (see JP-A-1-143257 and JP-A-5-95100). But with such ambient light photosensors a conductive film and insulator for electrostatic shielding are provided between the active matrix substrate and the gate wiring, and providing such conductive film entails a special process in addition to the usual fabrication processes for forming the ambient light photosensor on the active matrix substrate. This makes the fabrication troublesome and leads to a sharp rise in overall cost.

SUMMARY

An advantage of some aspects of the present invention is to provide a liquid crystal display device in which the ambient light photosensor is built into the liquid crystal display panel so as not to be affected by external noise and the peripheral circuits.

Another advantage is to provide a liquid crystal display device in which the ambient light photosensor and the output line leading out from the ambient light photosensor are incorporated in such a manner as not to be affected by external noise and the peripheral circuits.

Further another advantage is to provide a liquid crystal display device in which the ambient light photosensor and the output line are electrostatically shielded in a simple manner without increasing the fabrication processes for the liquid crystal display panel.

According to an aspect of the invention, a liquid crystal display device includes: a liquid crystal display panel in which a liquid crystal layer is provided between an active matrix substrate and a opposed substrate; a photosensing unit that is provided on the active matrix substrate and has an ambient light photosensor that senses external light; an output line that bears output signals out from the photosensing unit; a power line that supplies a constant voltage; and an illuminating unit that is controlled via the output of the photosensing unit. The ambient light photosensor is covered over by a transparent electrode, with a transparent insulating layer interposed, and the transparent electrode is electrically coupled to the power line.

According to the above aspect, the photosensing unit's ambient light photosensor is covered by a transparent electrode, and moreover the potential of the transparent electrode is stable at a constant voltage. This means that the transparent electrode acts as an electrostatic shield that renders the ambient light photosensor unlikely to be affected by external noise and the peripheral circuits, and therefore able to sense external light with high sensitivity, so that errors in the control of the illuminating unit will be few. What is more, a commonly-known item such as a TFT or a photodiode can be used as the ambient light photosensor in the invention.

In the above-described liquid crystal display device, preferably, the ambient light photosensor is constituted of a thin film transistor (TFT), and the transparent electrode covers the opposed portions of the TFT's source electrode and drain electrode, viewed from above.

According to the above aspect, a TFT is used as the ambient light photosensor and the opposed portions of the TFT's source electrode and drain electrode are covered by the transparent electrode, thanks to which the TFT, which functions as the ambient light photosensor and would otherwise be susceptible to the influence of external noise and the peripheral circuits, is effectively shielded from static.

In the above-described liquid crystal display device, preferably, the source electrode and drain electrode are both formed to be shaped like combs, and are disposed so as to mesh into each other with a certain distance intervening.

According to the above aspect, the channel region serving as the TFT ambient light photosensor is rendered large, with the result that light can be sensed over a wide range and furthermore the photosensing sensitivity is improved.

In the above-described liquid crystal display device, preferably, the surface of the TFT is covered over with a planarization layer, while the transparent electrode is formed on the surface of the planarization layer, and moreover is electrically coupled to the power line via a contact hole that is provided in the planarization layer and transparent insulating layer.

According to the above aspect, the TFT, transparent insulating layer, planarization layer and transparent electrode can all be formed simultaneously with formation of the active elements, the display section's pixel electrodes and the other items mounted on the active matrix substrate. Thus there is no need to increase the number of processes in order to form these components.

In the above-described liquid crystal display device, preferably, the output line, or alternatively both the output line and the power line, is/are covered over by the transparent electrode, with a transparent insulating layer interposed, and moreover the transparent electrode is electrically coupled to the power line via a contact hole that is formed in the transparent insulating layer.

According to the above aspect, out of the output line and power line coupled to the ambient light photosensor, at least the output line is covered and electrostatically shielded by the transparent electrode, and moreover the transparent electrode is electrically coupled to the power line via a contact hole that is formed in the transparent insulating layer. As a result, even if there is large fluctuation in the opposed substrate's VCOM voltage, such VCOM voltage will be prevented from affecting the output line and the feeble output signal carried therein.

In the above-described liquid crystal display device, preferably, two power lines are provided in parallel, and the output line is deposed between the two power lines.

According to the above aspect, the output line is surrounded and electrostatically shielded by the two power lines and the transparent electrode, and consequently will be little affected by external noise, in particular that which penetrates into the substrate horizontally. Also, with such structure, capacitors are formed between the power line and the output line, and such capacitors will prevent occurrence of parasitic capacitance between the output line and the common electrode provided on the opposed substrate, so that there will be little danger that the output signals transmitted through the output line will be affected by the voltage applied to the common electrode In the above-described liquid crystal display device, preferably, a first transparent insulating layer, the output line, a second transparent insulating layer, and the transparent electrode are stacked over the power line in the order given, when viewed from above, in such a manner that the power line, output line and transparent electrode are superposed; and moreover the transparent electrode is electrically coupled to the power line via a contact hole that is formed in the first and second transparent insulating layers.

According to the above aspect, the output line is sandwiched between and electrostatically shielded by the power line and the transparent electrode, and moreover the transparent electrode is electrically coupled to the power line via a contact hole that is formed in the first and second transparent insulating layers. This means that even if the opposed substrate's VCOM voltage fluctuates markedly, the transparent electrode will prevent such VCOM voltage from affecting the output line and the feeble output signal carried therein. Also, there will be little influence from external noise, etc., that penetrates the substrate vertically via the power line.

In the above-described liquid crystal display device, preferably, the widths of the power line and of the transparent electrode, in the direction orthogonal to the longitudinal direction, are larger than the output line's width in the same direction.

According to the above aspect, the widths of the power line and of the transparent electrode are made larger than that of the output line, so that the peripheries of the output line are covered by the power line and transparent electrode with wide margins, and thereby the shielding effect is enhanced.

In the above-described liquid crystal display device, preferably, the power line is formed from the same material as the gate electrodes of the TFTs which are formed on the active matrix substrate and serve as the switching elements for the liquid crystal display panel; the output line is formed from the same material as the source electrodes and drain electrodes of such TFTs; and the transparent electrode is formed from the same material as the pixel electrodes of the liquid crystal display panel.

According to the above aspect, thanks to the power line being formed from the same material as the gate electrodes of the TFTs serving as the switching elements for the liquid crystal display panel, to the output line likewise being formed from the same materials as those TFTs' source electrodes and drain electrodes, and to the transparent electrode being formed from the same material as the liquid crystal display panel's pixel electrodes, these lines, etc., can be formed without especially preparing any different materials, and moreover without increasing the fabrication processes for the liquid crystal display panel.

In the above-described liquid crystal display device, preferably, the power line is laid over the output line so as to be superposed thereover when viewed from above, with the transparent insulating layer interposed therebetween.

According to the above aspect, the output line is electrostatically shielded by the power line, which means that even if the opposed substrate's VCOM voltage fluctuates markedly, the power line will prevent such VCOM voltage from affecting the output line and the feeble output signal carried therein.

In the above-described liquid crystal display device, preferably, the width of the power line in the direction orthogonal to the longitudinal direction is larger than the output line's width in the same direction.

According to the above aspect, the width of the power line is made larger than that of the output line, so that the peripheries of the output line are covered over by the power line with wide margins, and thereby the shielding effect is enhanced.

In the above-described liquid crystal display device, preferably, the output line is formed from the same material as the source electrodes and drain electrodes of the TFTs that are formed on the active matrix substrate and serve as the switching elements for the liquid crystal display panel, and the power line is formed from the same material as the pixel electrodes of the liquid crystal display panel.

According to the above aspect, thanks to the output line being formed from the same material as the source electrodes and drain electrodes of the TFTs serving as the switching elements for the liquid crystal display panel, and to the power line being formed from the same material as the liquid crystal display panel's pixel electrodes, both these lines can be formed without especially preparing any different materials, and moreover without increasing the fabrication processes for the liquid crystal display panel.

In the above-described liquid crystal display device, preferably, the output line is formed from the same material as the gate electrodes of the TFTs that are formed on the active matrix substrate and serve as the switching elements for the liquid crystal display panel, and the power line is formed from the same material as the source electrodes and drain electrodes of such TFTs.

According to the above aspect, thanks to the output line being formed from the same material as the gate electrodes of the TFTs serving as the switching elements for the liquid crystal display panel, and to the power line being formed from the same material as such TFTs' source electrodes and drain electrodes, both these lines can be formed without especially preparing any different materials, and moreover without increasing the fabrication processes for the liquid crystal display panel.

In the above-described liquid crystal display device, preferably, the power line and output line are formed simultaneously with the process of fabricating the TFTs that are formed on the active matrix substrate and serve as the switching elements for the liquid crystal display panel.

According to the above aspect, both the power line and the output line are formed simultaneously with formation of the active elements, the display section's pixel electrodes and the other items mounted on the active matrix substrate. Thus there is no need to increase the number of processes in order to form these components.

In the above-described liquid crystal display device, preferably, the ambient light photosensor is composed of a TFT and a capacitor.

In the above-described liquid crystal display device, preferably, the TFT's source electrode is coupled to one of the capacitor's electrodes, and additionally is coupled to the output line, while the capacitor's other electrode is coupled to the power line.

According to the above aspect, the presence of a capacitor between the output line and the power line, which is constant-voltage, means that abrupt voltage fluctuation is curbed, so that even if the opposed substrate's VCOM voltage fluctuates markedly, the effect thereof on the output line's signal can be curbed.

In the above-described liquid crystal display device, preferably, a particular negative voltage is applied to the TFT's gate electrode, the TFT's source electrode is coupled to one of the capacitor's electrodes and is also coupled to a standard voltage supply via a switching element; and the capacitor is charged by turning on the switching element.

According to the above aspect, the circuitry is so configured that a particular negative voltage is applied to the TFT's gate electrode, the TFT's source electrode is coupled to one of the capacitor's electrodes, and charging with a standard voltage is effected via a switching element, thereby constituting the photosensing circuitry of claims 15 and 16.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the present invention will now be described in detail with reference to the accompanying drawings. It should be understood however that the embodiments described below are by way of examples of liquid crystal display devices realizing the technical thought of the invention and are not to be construed as limiting the invention to these particular devices. The invention can be applied equally well in numerous variations without departing from the scope and spirit of the claims appended hereto.

First Embodiment

Figure 1:
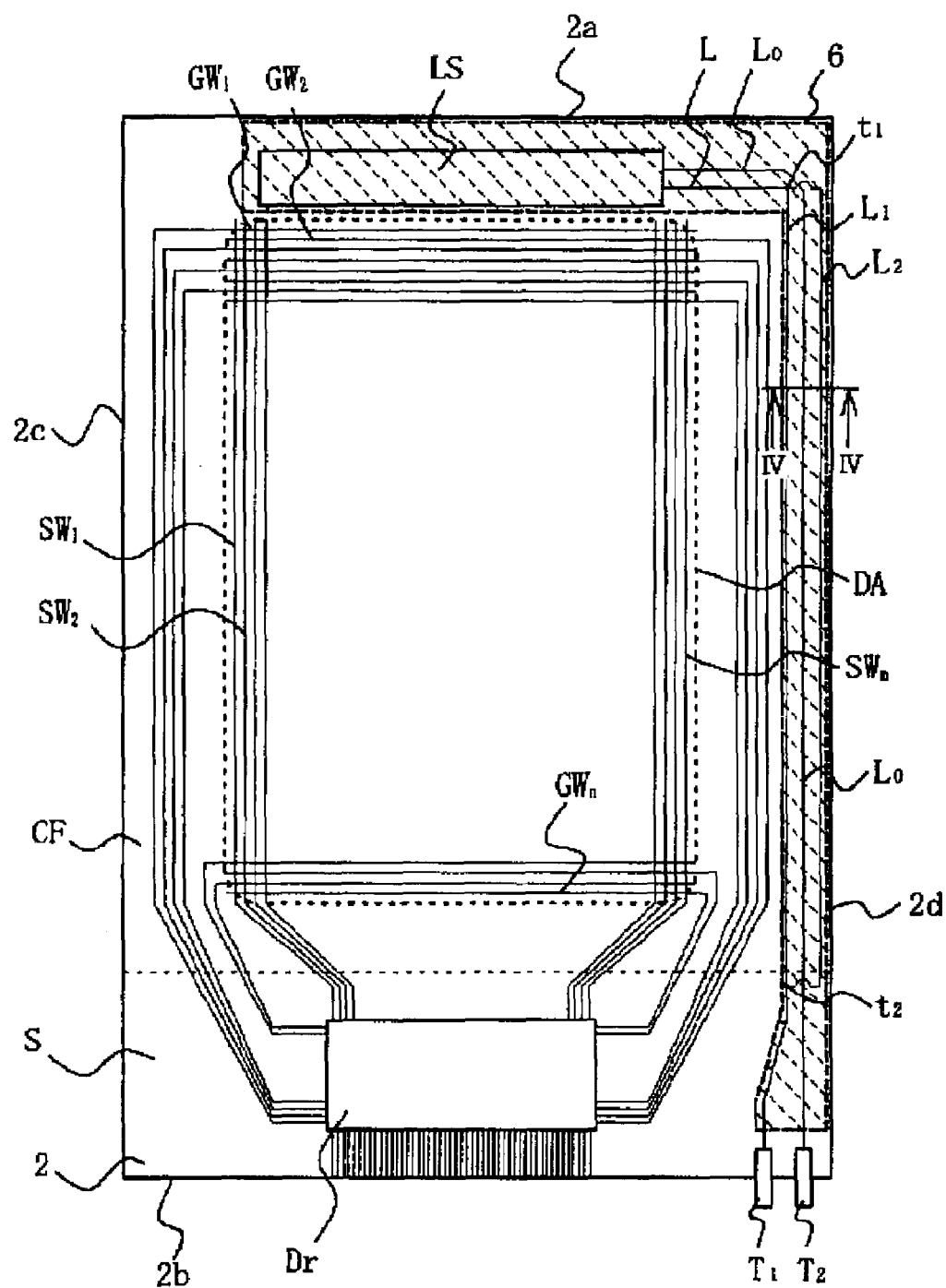
FIG. 1 is a plan view illustrating schematically the TFT substrate of the liquid crystal display panel in a First Embodiment of the present invention, seen through the color filter substrate.

FIG. 1 is a plan view illustrating schematically the TFT substrate in a liquid crystal display panel of a First Embodiment of the present invention, seen through the color filter substrate.

As FIG. 1 shows, a liquid crystal display panel 1 has a pair of rectangular substrates, namely an active matrix substrate (below, "TFT substrate") 2 and a color filter substrate CF, that are constituted of a transparent material such as glass and deployed opposing each other. The TFT substrate 2 is of a larger size than the color filter substrate CF, so that when it is positioned opposing the color filter substrate CF, an overhang portion S of a particular extent is formed. The structure is such that seal material is stuck around the peripheries of the TFT substrate 2 and color filter substrate CF, and liquid crystal and spacers are sealed into the interior space therebetween.

On the opposed faces of the TFT substrate 2 and color filter substrate CF, there are formed various wiring lines, etc. On the color filter substrate CF, these include: black matrices provided in a matrix pattern matching the pixel regions of the TFT substrate 2; color filters (omitted in the drawing) for, say, red (R), green (G) and blue (B), that are provided in the areas enclosed by the black matrices; and a common electrode that is electrically coupled to the TFT substrate 2's electrodes and covers the color filters. Also, a backlight not shown in the drawing is provided on the reverse face of the TFT substrate 2, and is controlled via signals output from a photosensing unit LS.

The TFT substrate 2 has opposed short edges 2a, 2b and opposed long edges 2c, 2d. At one short edge 2b is located the protruding portion S, on which are mounted a semiconductor chip Dr for a source driver and a gate driver; while at the other short edge 2a, the photosensing unit LS is disposed.

The TFT substrate 2 has, on the obverse face thereof, that is, on the face that contacts with the liquid crystal, gate wires $GW_1$ to $GW_n$ (n=2, 3, 4 . . . ) laid out in the sidewise direction in FIG. 1 at a particular spacing, and source wires $SW_1$ to $SW_m$ (m=2, 3, 4 . . . ) that are insulated from the gate wires $GW_1$ to $GW_n$ and are laid out in the lengthwise direction. These source wires $SW_1$ to $SW_m$ and gate wires $GW_1$ to $GW_n$ are arranged in a matrix pattern, and in the areas enclosed by the intercrossing gate wires $GW_1$ to $GW_n$ and source wires $SW_1$ to $SW_m$ there are formed switching elements (omitted from the drawing) that are turned on by scan signals from the gate wires $GW_1$ to $GW_n$, and pixel electrodes to which picture signals from the source wires $SW_1$ to $SW_m$ are supplied via the switching elements.

The areas enclosed by the gate wires $GW_1$ to $GW_n$ and source wires $SW_1$ to $SW_m$ constitute what are termed pixels. The region where such pixels are formed is the display area DA, or in other words the image display section. For the switching elements, thin film transistors (TFTs) or the like will be employed.

Each gate wire $GW_1$ to $GW_n$ and source wire $SW_1$ to $SW_m$ is extended out of the display area DA, passed around the outer periphery region lying outside the display area DA, and coupled to the semiconductor chip Dr for the source driver and gate driver. The photosensing unit LS is provided on the short edge 2a of the TFT substrate 2, and on the long edge 2d thereof are disposed lead-out lines $L_0$, L that lead out from the photosensing unit LS and are coupled to terminals $T_1$, $T_2$, to which the external control circuits are coupled. The region where the photosensing unit LS and lead-out lines L, $L_0$ are formed, that is, the region indicated by the diagonal lines in FIG. 1, is given a shielded structure which will be described later.

Figure 2A:
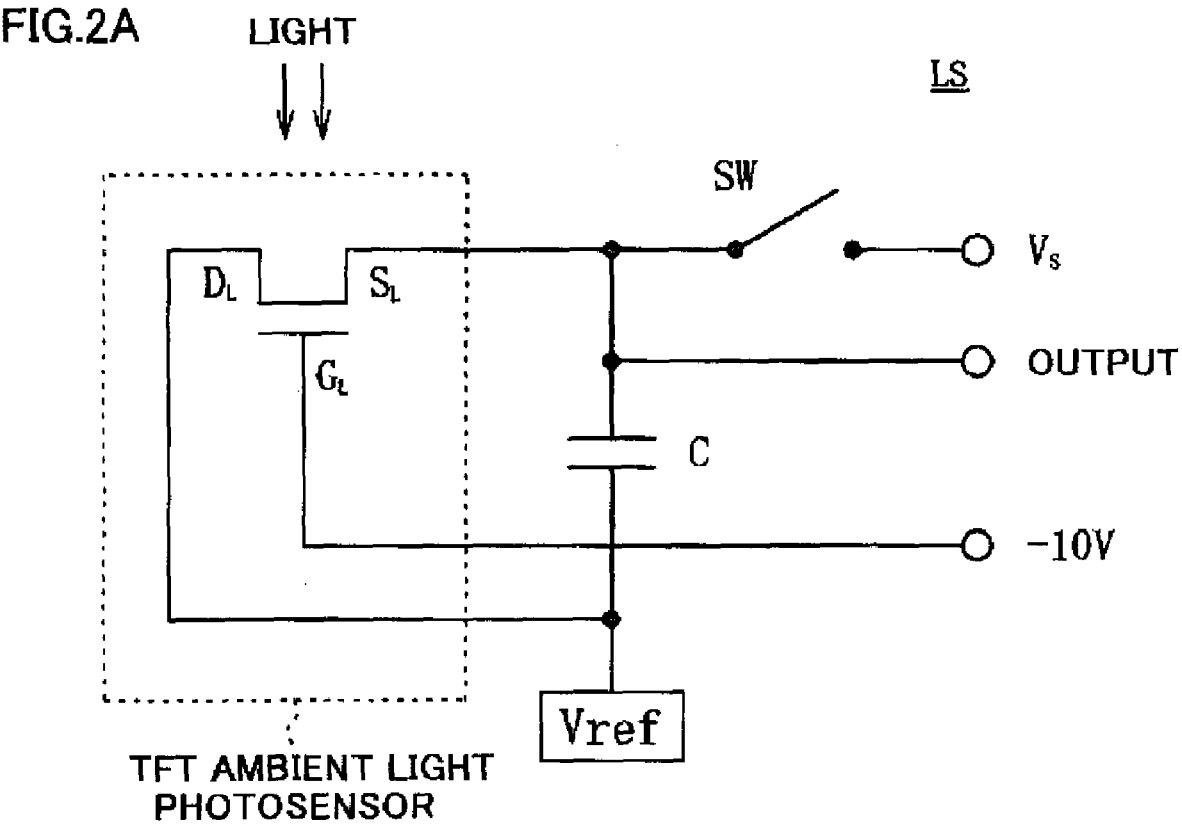
FIG. 2A is an equivalent circuit diagram of the photosensing unit, and FIG. 2B gives waveform diagrams explicating the relation between the sensor output and the VCOM voltage that is applied to the common electrode.
Figure 2B:
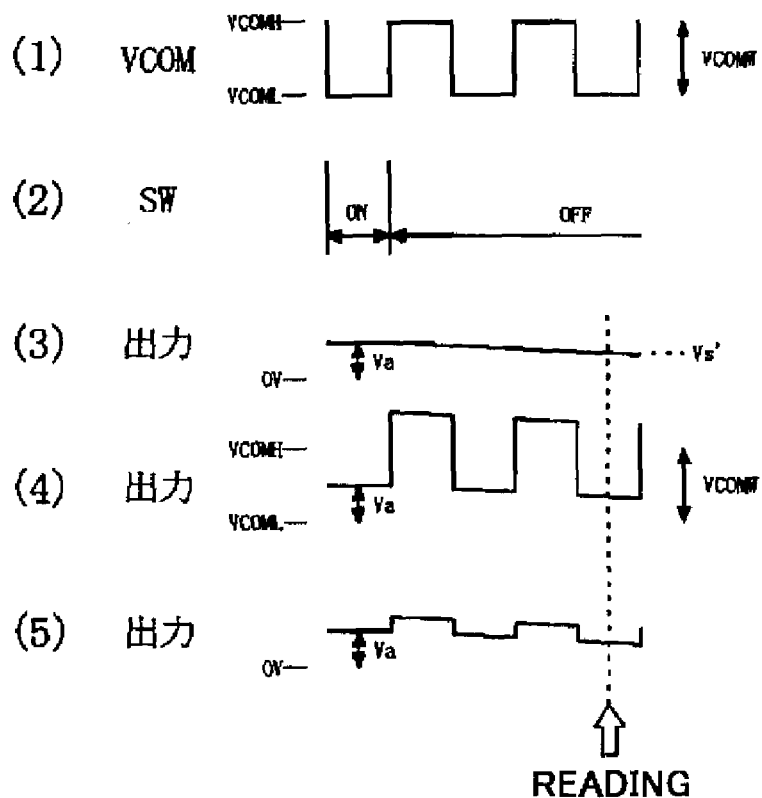
Figure 3:
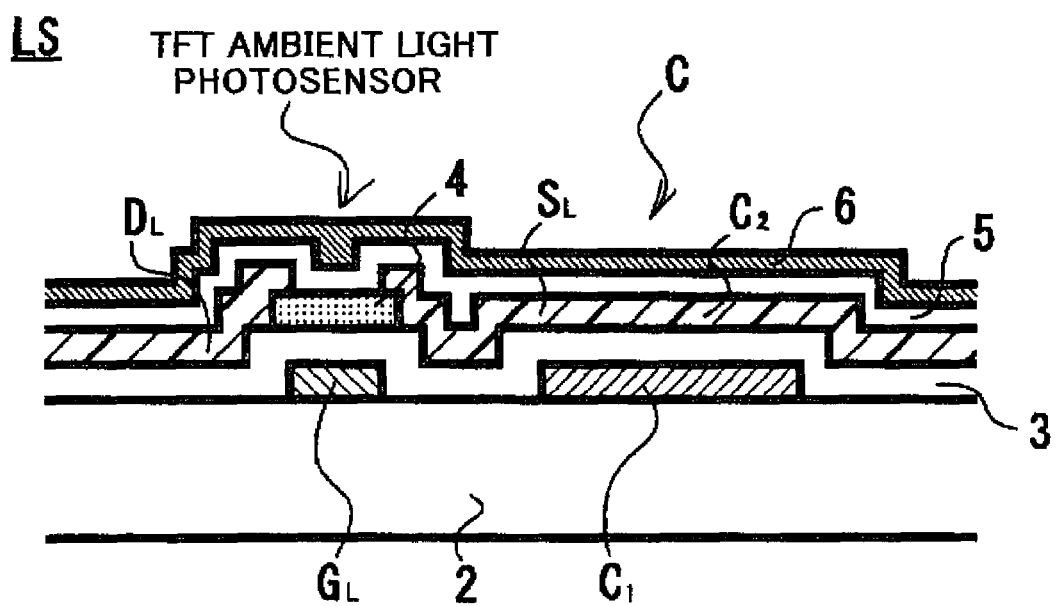
FIG. 3 is a cross-sectional view through the photosensing unit.
Figure 4:
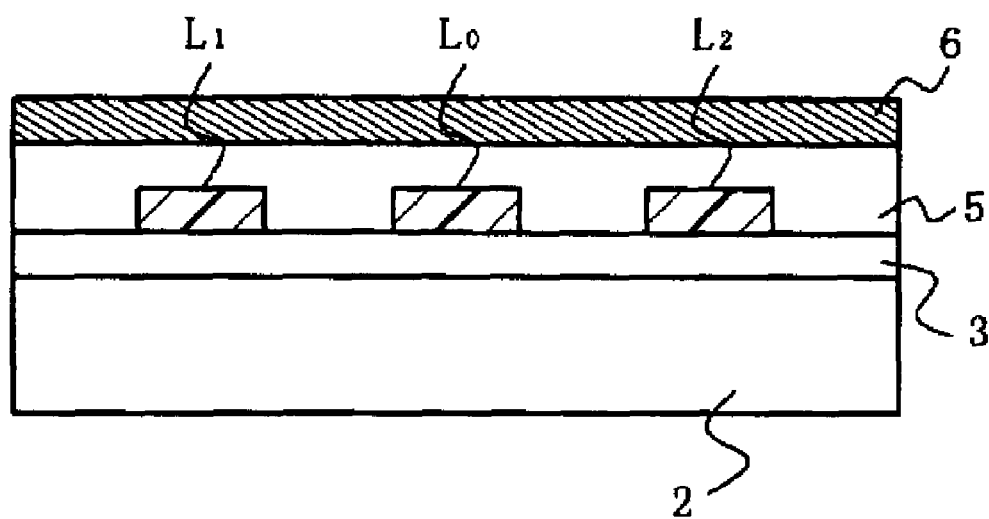
FIG. 4 is a cross-sectional view along line IV-IV in FIG. 1.

Next are described the structures of the photosensing unit LS and the lead-out lines L, $L_0$, with reference to FIGS. 1 to 4. FIG. 2A is an equivalent circuit diagram of the photosensing unit, FIG. 2B gives waveform diagrams explicating the relation between the sensor output and the VCOM voltage that is applied to the common electrode, FIG. 3 is a cross-sectional view through the photosensing unit, and FIG. 4 is a cross-sectional view along line IV-IV in FIG. 1.

As FIG. 2A shows, the circuitry of the photosensing unit LS is so configured that a capacitor C is coupled in parallel between the TFT ambient light photosensor's drain electrode $D_L$ and source electrode $S_L$, the source electrode $S_L$ and one terminal of the capacitor C are coupled to a standard voltage supply Vs via a switching element SW, and the drain electrode $D_L$ and the other terminal of the Capacitor C are coupled to a standard voltage supply Vref. The standard voltage supply Vref is a constant DC voltage supply. Gate-OFF voltage of, for example, −10V is applied to the gate electrode $G_L$. The output of the photosensing unit LS is led out through the source electrode $S_L$, which serves as one terminal of the capacitor C.

The photosensing unit LS is formed on the TFT substrate 2. More precisely, as FIG. 3 shows, on the TFT substrate 2 there are formed the gate electrode $G_L$ of the TFT ambient light photosensor and one terminal $C_1$ of the capacitor C, and over these, so as to cover the surfaces thereof, there is laid a gate insulator 3 constituted of silicon nitride, silicon oxide or the like. Over the TFT ambient light photosensor's gate electrode $G_L$ there is formed, with the gate insulator 3 interposed, a semiconductor layer 4 constituted of amorphous silicon, polysilicon or the like, and over the gate insulator 3 are provided the TFT ambient light photosensor's source electrode $S_L$ and drain electrode $D_L$, which are constituted of aluminum, molybdenum or like metal, in such a manner as to be electrically coupled to the semiconductor layer 4. The TFT ambient light photosensor's source electrode $S_L$ is extended to form the other terminal $C_2$ of the capacitor C. Further, a protective insulator 5 constituted of inorganic insulative material or the like is laid so as to cover the surfaces of the TFT ambient light photosensor and capacitor C, and moreover there is formed thereon a conductive film (ITO) 6 of transparent material. This conductive film 6 is an extension of the pixel electrodes for driving the liquid crystal.

The TFT ambient light photosensor is formed simultaneously with the TFTs that serve as the switching elements, during the liquid crystal display panel fabrication process. Thus, there is no need to especially increase the fabrication processes in order to provide the photosensing unit LS. Also, it will be possible to use multiple TFT ambient light photosensors rather than a single one, and to provide them in a row at the short edge 2a. Deposing a row of multiple TFT ambient light photosensors on the short edge will mean that if the user should accidentally obstruct some of the TFT ambient light photosensors with a finger, etc., it is unlikely that all of the TFT ambient light photosensors will be so obstructed at the same time, and those TFT ambient light photosensors that remain unobstructed will be able to sense light. The photosensing unit LS is provided at the outer edge of the display area DA, or more precisely, on the inside of the region where the seal material is applied, being formed at the location contacting with the liquid crystal layer. Alternatively the photosensing unit LS may be provided on the outside of the seal region. Leading out from the photosensing unit LS are a power line L that is coupled to the drain electrode $D_L$, and an output line $L_0$ that is coupled to the source electrode $S_L$. Also leading out from the photosensing unit LS, but omitted from the drawings, is a lead-out line that is coupled to the gate electrode $G_L$.

Of the lead-out lines L and $L_0$, the power line L bifurcates, as FIG. 1 shows, into two lines at the position indicated by reference numeral $t_1$, close to the corner portion enclosed by the short edge 2a and the long edge 2d. The two power lines $L_1$, $L_2$ resulting from such bifurcation straddle the output line $L_0$ beside the long edge 2d, and are laid so as to run alongside the output line $L_0$. More precisely, the two power lines $L_1$, $L_2$ resulting from the bifurcation are laid one on each side of the output line $L_0$, utilizing the space beside the long edge 2d, and are made to run as far as the protruding portion S, after which they are joined together at the position indicated by reference numeral $t_2$, then connected to terminal $T_1$. The reference numerals $t_1$ and $t_2$ indicate the bifurcation and rejoining points respectively.

The cross-sectional structure of the power lines $L_1$, $L_2$ resulting from the bifurcation, and of the output line $L_0$, is so configured that such power lines $L_1$, $L_2$ are disposed on the gate insulator 3 provided over the TFT substrate 2 in positions on either side of and at a particular distance from the output line, so that the latter is located centrally therebetween, as shown in FIG. 4. The two power lines $L_1$, $L_2$ are covered by the protective insulator 5, over which is formed the conductive film (ITO) 6 of transparent material. Also, contact holes that are used to electrically couple the power lines $L_1$, $L_2$ and the conductive film 6 are formed in any desired locations in the protective insulator 5. Further, the conductive film 6 is connected to the standard voltage supply Vref.

Thus, the peripheral areas around the output line $L_0$ are covered by the power lines $L_1$, $L_2$ and the conductive film 6, which are coupled to the standard voltage supply Vref. The output line $L_0$ is thereby shielded against static and hence will not be affected by external noise. Also, as shown in FIG. 2, part of the capacitance of the capacitor C is formed between the output line $L_0$ and the various power lines L, $L_1$, $L_2$, and such capacitance is large due to the fact that the output line $L_0$ and the power lines L, $L_1$, $L_2$, are laid alongside the long edge 2d of the TFT substrate 2. Furthermore, during the liquid crystal panel fabrication process, the power lines L, $L_1$, $L_2$ and output line $L_0$, like the source electrode $S_L$ and drain electrode $D_L$ of the TFT ambient light photosensor, are formed using the same material as the source wires $SW_1$ to $SW_m$ of the TFTs that serve as switching elements. This means that the lead-out lines L and $L_0$ to $L_2$ can be formed simultaneously with the formation process for the source wires $SW_1$ to $SW_m$ of the TFTs serving as switching elements, and thus can be formed in a simple manner without increasing the number of processes.

In the example described here the power line L bifurcates into two, but it will alternatively be possible to provide beforehand two power lines $L_1$, $L_2$ in parallel with the output line $L_0$, and electrically couple each of the two power lines $L_1$, $L_2$ to the conductive film 6 via contact holes provided in the protective insulator 5.

Next is described, with reference to FIG. 2, the operation of the photosensing unit LS.

First, a constant DC voltage (for example, 0V) is applied from the standard power supply Vref to the drain electrode $D_L$, and also a constant negative voltage (for example, −10V) is applied to the TFT ambient light photosensor's gate electrode $G_L$. Then the switching element SW is turned on for a particular duration (see (2) of FIG. 2B for an example) to apply a constant standard voltage Vs (for example +2V) to the capacitor C, and the capacitor C is charged with the voltage difference Va between the standard voltage Vs and the DC voltage from the standard voltage supply $V_{ref}$. At this point, the VCOM voltage constituted of rectangular waves having a particular amplitude such as shown in (1) of FIG. 2B is applied to the common electrode of the color filter substrate CF. In this state, when external light shines on the TFT ambient light photosensor, leakage current flows in the TFT ambient light photosensor and a part of the capacitor C's charging voltage is discharged. Since the amount so discharged increases with time and depending on the brightness of the surroundings, the output voltage Vs', that is, the capacitor C's charging voltage minus such discharged voltage, will be the voltage obtaining after a decrease that describes a discharge curve such as shown in (3) of FIG. 2B (this is shown linearly in simplified form in FIG. 2). This output voltage Vs' is then read by an output reading unit (not shown), and used to perform control of the backlight.

According to the First Embodiment, the power lines $L_1$, $L_2$ are deposed on either side of the output line $L_0$, and moreover the output line $L_0$ and power lines $L_1$, $L_2$ are covered by the conductive film 6 with the protective insulator 5 interposed. Furthermore, one of the power lines L, $L_1$, $L_2$ is electrically coupled to the conductive film 6, so that the conductive film 6 is coupled to the standard voltage supply Vref. Hence, the output line $L_0$ is electrostatically shielded and the effects of external noise are curbed.

Also, due to the fact that the capacitance formed between the power lines and the output line is made a constant DC voltage, as is also the standard voltage supply Vref, a stable output voltage Vs' can be obtained that, to the extent possible, is not affected by the VCOM voltage. If, instead of being a constant DC voltage the standard voltage supply Vref was made into the VCOM voltage, which is composed of rectangular waveforms, then the output voltage would, as shown in (4) of FIG. 2B, fall in synchrony with the VCOM voltage, and lack stability, so that the reading unit would have difficulty in reading it. Further, if a structure was used whereby the area surrounding the output line $L_0$ was unshielded, with a constant DC voltage used for the standard voltage supply Vref, then due to the parasitic capacitance that would arise between the output line $L_0$ and the common electrode, the output voltage would be affected by VCOM voltage and would be unstable in the manner shown in (5) of FIG. 2B.

Figure 5A:
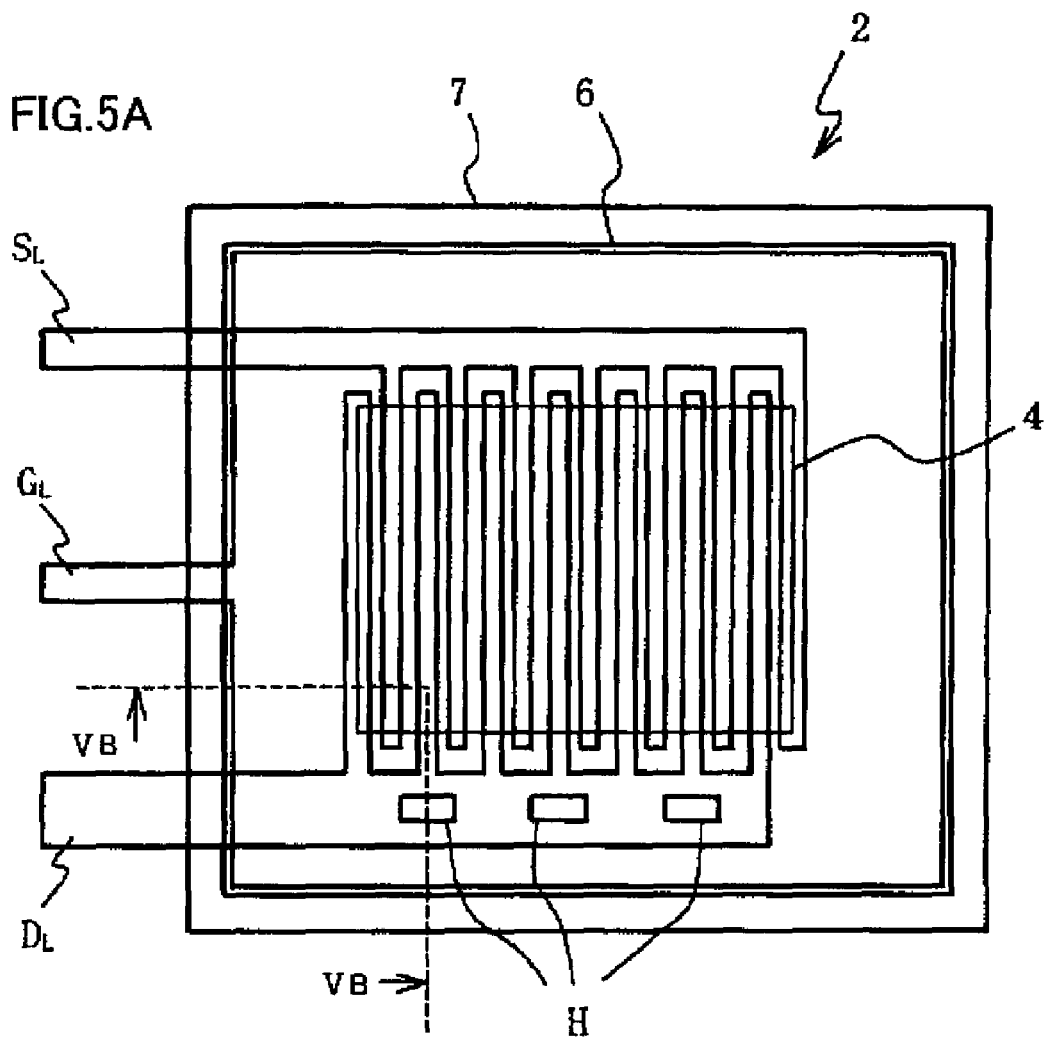
FIG. 5 illustrates a variant of the ambient light photosensor forming a component of the photosensing unit LS, FIG. 5A being a schematic plan view of the ambient light photosensor on the TFT substrate, seen through the sensor window in the CF substrate, and FIG. 5B being a cross-sectional view along line VB-VB in FIG. 5A.
Figure 5B:
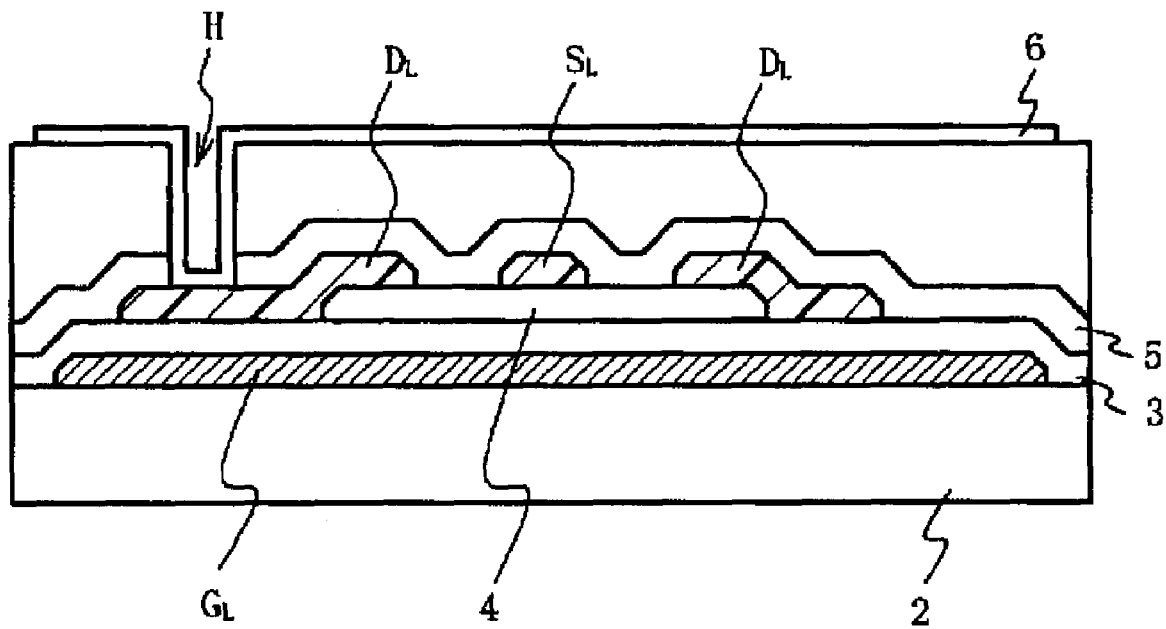

FIG. 5 shows a variant of the ambient light photosensor that is a component of the photosensing unit LS; FIG. 5A is a schematic plan view of this ambient light photosensor on the TFT substrate, seen through the sensor window in the CF substrate, and FIG. 5B is a cross-sectional view along line VB-VB in FIG. 5A.

This variant TFT ambient light photosensor of the photosensing unit LS has, first of all, a TFT ambient light photosensor gate electrode $G_L$ formed on the TFT substrate 2, as shown in FIG. 5. The gate electrode $G_L$ is covered by a gate insulator 3, and directly above the gate insulator 3 that covers the gate electrode $G_L$ there is formed a semiconductor layer 4. Also, a drain electrode $D_L$ and a source electrode $S_L$ are provided on the gate insulator 3 so as to contact with the semiconductor layer 4. As shown in FIG. 5A, the drain electrode $D_L$ and the source electrode $S_L$ each have electrode strips resembling the teeth of a comb, with gaps of a certain size, and are formed on the gate insulator 3 in such a manner that the comb-tooth-like electrode strips of one enter into the gaps of the other.

Thus, the electrode strips of the source electrode $S_L$ and of the drain electrode $D_L$ are deployed so as to alternate with each other. As a result of arranging the electrode strips alternately in this manner, the channels delimited by the source electrode $S_L$ and drain electrodes $D_L$ are enlarged, enabling sensing of external light across a wide range. Viewed from above, the semiconductor layer 4, source electrode $S_L$ and drain electrodes $D_L$ are disposed inside the gate electrode $G_L$. As a result of so disposing the semiconductor layer 4, source electrode $S_L$ and drain electrodes $D_L$ inside the gate electrode $G_L$, the light from the backlight on the reverse face of the TFT substrate 2 is blocked by the gate electrode $G_L$ and will not shine into the semiconductor layer 4.

Also, the gate electrode $G_L$ is formed to be larger than the sensor window provided in the CF substrate. Further, the drain electrodes $D_L$, source electrode $S_L$ and semiconductor layer 4, as well as their surrounding areas, are covered by the protective insulator 5, and a planarization layer 7 is formed over the protective insulator 5. In turn, the surface of the planarization layer 7 is covered by the conductive film 6. Also, in the protective insulator 5 and planarization layer 7 there is formed a contact hole H, and utilizing this contact hole H, the drain electrode $D_L$ and conductive film 6 are electrically coupled. Thereby, the conductive film 6 is coupled to the standard voltage supply Vref.

According to such configuration, the conductive film 6 is formed on the TFT substrate 2 so as to cover the TFT ambient light photosensor and the output line $L_0$ thereof, with the protective insulator 5 and planarization layer 7 interposed therebetween; the conductive film 6 is electrically coupled to the drain electrode $D_L$ via the contact hole H; and moreover the conductive film 6 is coupled to the standard voltage supply Vref. Hence the conductive film 6, which is coupled to the power lines L, $L_1$ and $L_2$, intervenes between the VCOM voltage applied to the CF substrate's common electrode, on the one hand, and the source electrode $S_L$ and output line $L_0$ on the other, with the result that the VCOM voltage is prevented from affecting the TFT ambient light photosensor's output signals.

Second Embodiment

Figure 6:
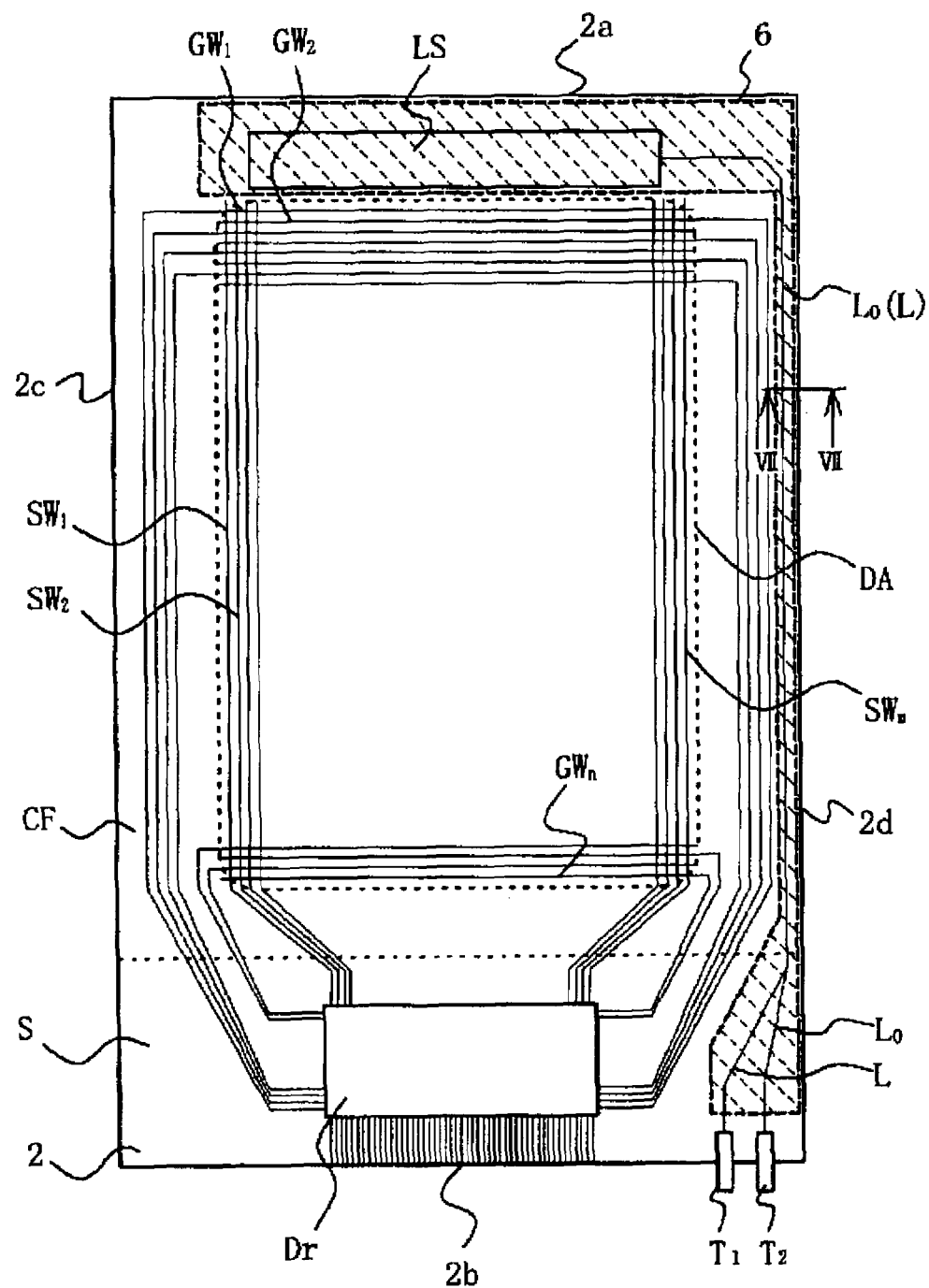
FIG. 6 is a plan view illustrating schematically the TFT substrate in a Second Embodiment of the invention, seen through the liquid crystal display panel's color filter substrate.
Figure 7:
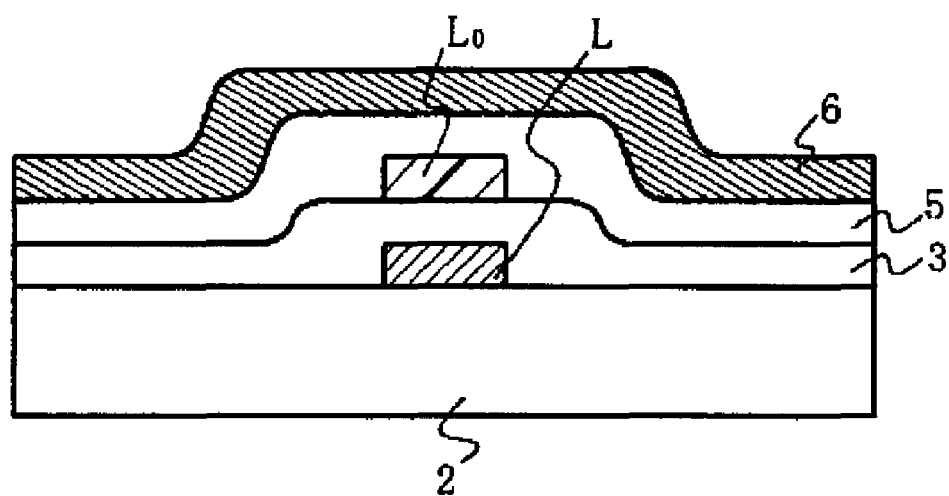
FIG. 7 is a cross-sectional view along line VII-VII in FIG. 6.

FIG. 6 is a schematic plan view of the TFT substrate in a Second Embodiment of the invention, seen through a liquid crystal display panel's color filter substrate, and FIG. 7 is a cross-sectional view along line VII-VII in FIG. 6.

Compared with the liquid crystal display panel 1 of the First Embodiment, a liquid crystal display panel 1A of the Second Embodiment has a similar structure, except that the power line and output line are disposed in a stacked arrangement. Below, accordingly, the structural elements that are in common with the First Embodiment are assigned the same reference numerals as before, and only those elements that differ are described, so as to avoid redundancy.

In the liquid crystal display panel 1A, the power line L and output line $L_0$ issuing from the photosensing unit LS are stacked, with the gate insulator 3 interposed therebetween. More precisely, as FIG. 7 shows, the structure is such that: the power line L is provided, during the same process as the gate electrode $G_L$, on the TFT substrate 2; the power line L is covered by the gate insulator 3; the output line $L_0$ is laid, during the same process as the source electrode $S_L$ and drain electrodes $D_L$, so as to be superposed over the power line L with the gate insulator 3 interposed; and these various elements are covered over by the protective insulator 5, which in turn is covered over by the conductive film (ITO) 6 constituted of transparent material.

The power line L is coupled to the drain electrode $D_L$ via a contact hole (omitted from the drawing) that is provided in part of the gate insulator 3. Also, at any desired place in the insulators 3 and 5, there is formed another contact hole (omitted from the drawing), utilizing which the power line L and conductive film 6 are electrically coupled. Further, by means of such connection the conductive film 6 is connected to the standard voltage supply Vref. The output line $L_0$ is formed from the same materials and in the same fabrication process as the source electrode $S_L$, and so as to be integrated therewith. The power line L is formed from the same materials and in the same fabrication process as the gate electrode $G_L$. Consequently, these lead-out lines are simple to fabricate.

According to such configuration, the power line L is disposed directly below the output line $L_0$, with the gate insulator 3 interposed, and the conductive film 6 is disposed directly thereover with the protective insulator 5 interposed, so that the output line $L_0$ is enclosed and electrostatically shielded by the conductive film 6 and the power line L. Adopting such a structure yields shielding against noise, particularly that from directly under the TFT substrate 2.

Figure 8A:
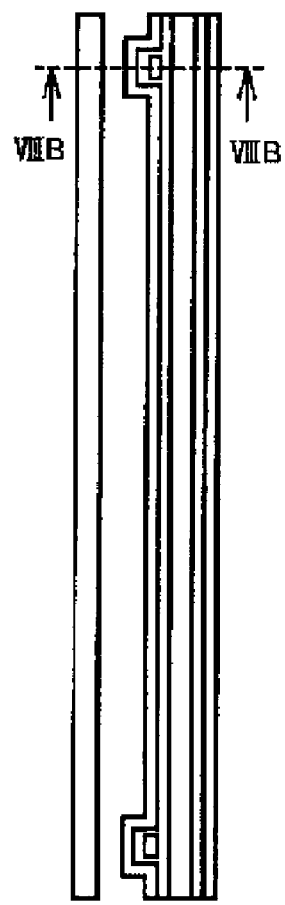
FIG. 8 illustrates a variant form of the lead-out lines, FIG. 8A being a plan view illustrating schematically the wiring and lead-out lines at one long edge 2b portion in FIG. 6, and FIG. 8B being a cross-sectional view along line VIIIB-VIIIB in FIG. 8A.
Figure 8B:
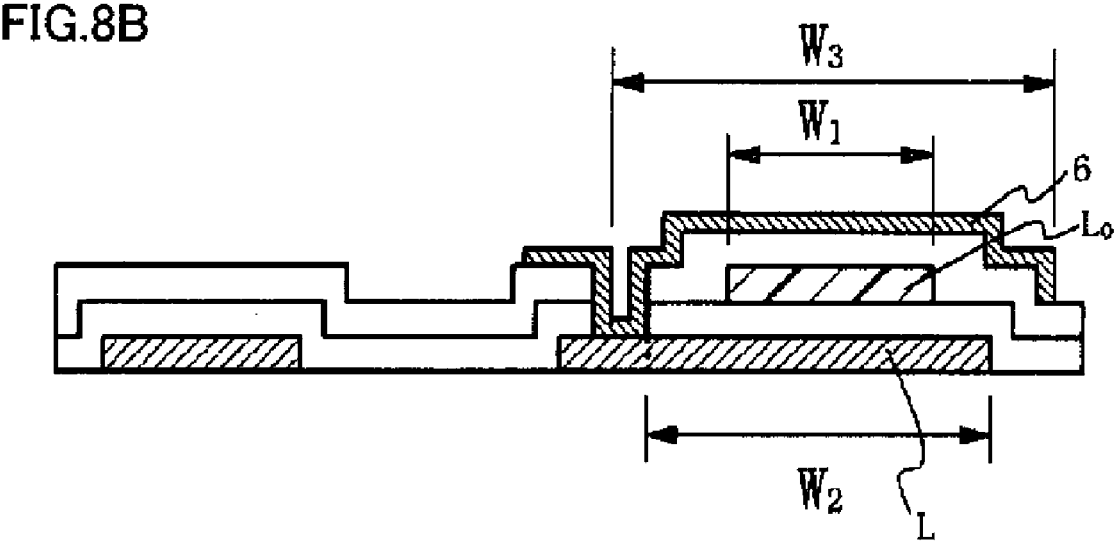

Although the widths of the lead-out lines L and $L_0$ shown in FIG. 7 are roughly the same, the width of the power line L will preferably be greater than that of the output line $L_0$. FIG. 8 shows a variant form of the liquid crystal display panel lead-out lines shown in FIG. 6; FIG. 8A is an enlarged plan view showing schematically the wiring and lead-out lines at one long edge (2d) portion in FIG. 6, and FIG. 8B is a cross-sectional view along line VIIIB-VIIIB in FIG. 8A.

In this variant, the widths of the power line L and output line $L_0$ in the direction orthogonal to the lengthwise direction are denoted by $W_2$ and $W_1$ respectively, and $W_2$ is broader than $W_1$. Further, the output line $L_0$ is covered by the conductive film 6, which has a width $W_3$ larger still than the width $W_2$ of the power line L. The output line $L_0$ is covered above and below by insulators 3 and 5. In these insulators 3 and 5 there is formed a contact hole H, via which the conductive film 6 is electrically coupled to the power line L. Also, by means of such coupling the conductive film 6 is coupled to the standard voltage supply Vref. Thanks to this configuration, almost the entire periphery of the output line $L_0$ is covered by the broad conductive film 6 and power line L, and thereby the shielding effect is further enhanced.

Third Embodiment

Figure 9:
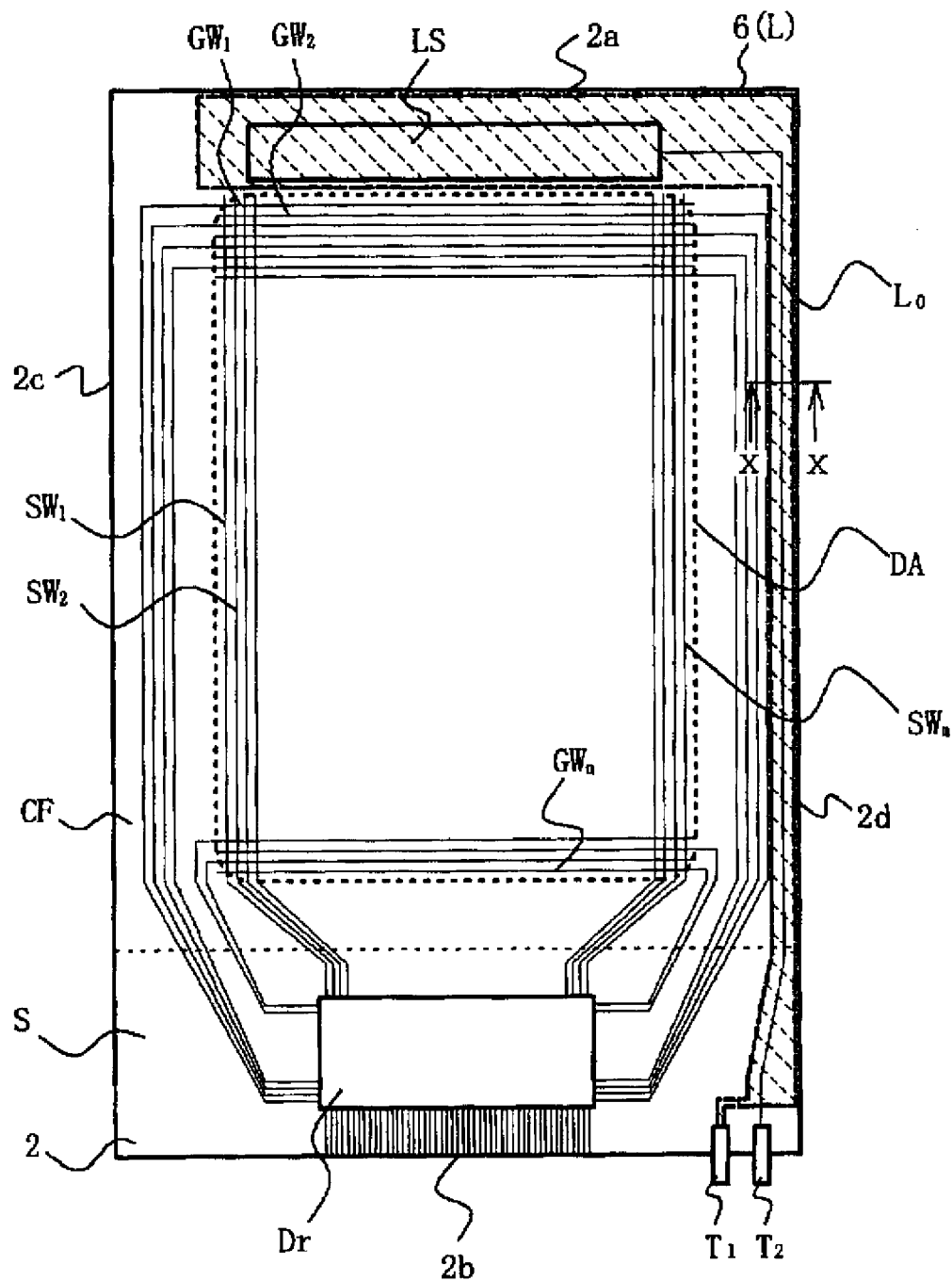
FIG. 9 is a plan view of the liquid crystal display panel of a Third Embodiment of the invention, presented in such a manner that, through the color filter substrate that is laid over the TFT substrate, the wiring, etc., of the TFT substrate beneath is visible.
Figure 10:
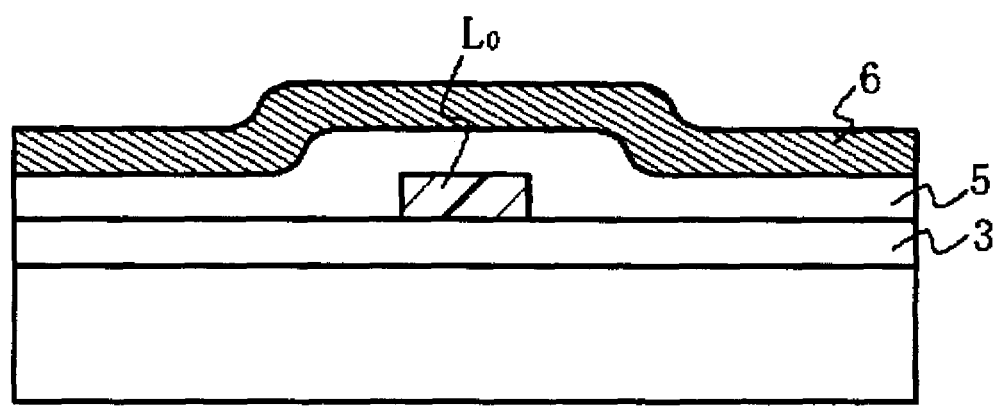
FIG. 10 is a cross-sectional view along line X-X in FIG. 9.

FIG. 9 is a plan view of the liquid crystal display panel of a Third Embodiment of the invention, presented in such a manner that, through the color filter substrate that is laid over the TFT substrate, the wiring of the TFT substrate beneath is visible. FIG. 10 is a cross-sectional view along line X-X in FIG. 9. This liquid crystal display panel 1B of the Third Embodiment has a structure similar to the liquid crystal display panel 1 of the First Embodiment, except that the power line and output line are disposed in a stacked arrangement. Below, accordingly, the structural elements that are in common with the First Embodiment are assigned the same reference numerals as before, and only those elements that differ are described, so as to avoid redundancy.

This liquid crystal display panel 1B is so structured that the output line $L_0$ issuing from the photosensing unit LS is formed on the gate insulator 3 and covered by the protective insulator 5, and the conductive film (ITO) 6, which is coupled to the drain electrode $D_L$ and constituted of transparent material, is formed on the protective insulator 5. More precisely, the conductive film 6 serves as the power line L and is coupled to the external circuits via terminal $T_1$. Thus the output line $L_0$ is covered above by the conductive film (ITO) 6, which serves as the power line L, and as a result the output line $L_0$ is electrostatically shielded, so that noise, particularly that from directly above the TFT substrate 2, is blocked out. The output line $L_O$ is formed from the same material and in the same fabrication process as the source electrode $S_L$, and so as to be integrated therewith, while the conductive film 6 serving as the power line L is formed simultaneously with the pixel electrodes for driving the liquid crystal, and moreover one end portion thereof is coupled to the drain electrode $D_L$. Consequently, the lead-out lines L and $L_O$ are simple to form.

Fourth Embodiment

Figure 11:
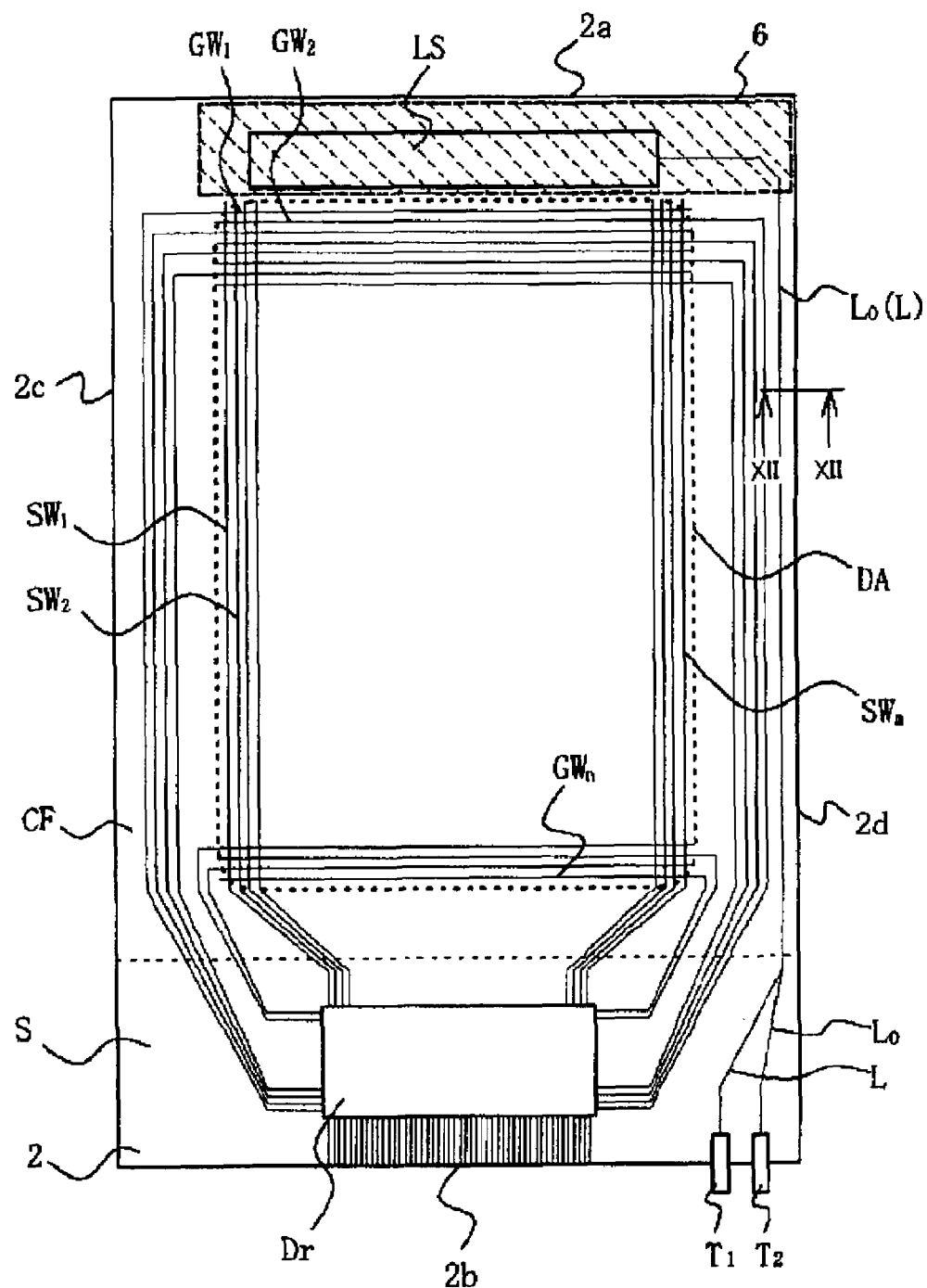
FIG. 11 is a plan view of the liquid crystal display panel of a Fourth Embodiment of the invention, presented in such a manner that, through the color filter substrate that is laid over the TFT substrate, the wiring, etc., of the TFT substrate beneath is visible.
Figure 12:
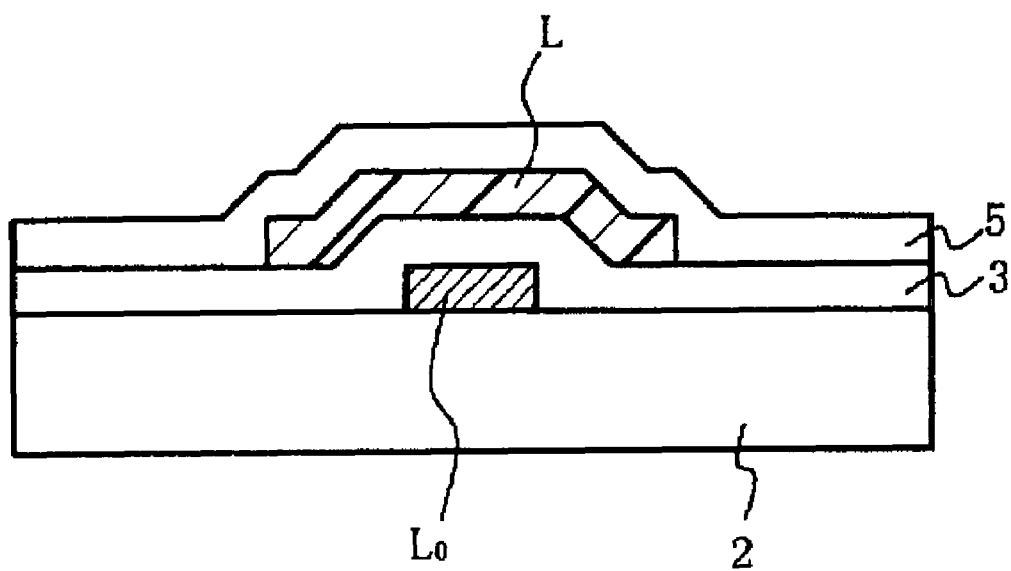
FIG. 12 is a cross-sectional view along line XII-XII in FIG. 11.

FIG. 11 is a plan view of the liquid crystal display panel of a Fourth Embodiment of the invention, presented in such a manner that, through the color filter substrate that is laid over the TFT substrate, the wiring of the TFT substrate beneath is visible. FIG. 12 is a cross-sectional view along line XII-XII in FIG. 11. This liquid crystal display panel 1C has a structure similar to the liquid crystal display panel 1 of the First Embodiment, except that the power line and output line are disposed in a stacked arrangement. Below, accordingly, the structural elements that are in common with the First Embodiment are assigned the same reference numerals as before, and only those elements that differ are described, so as to avoid redundancy.

In this liquid crystal display panel 1C, as FIGS. 11 and 12 show, the output line $L_O$ is formed on the TFT substrate 2 and covered by the gate insulator 3, and on the gate insulator 3 there is formed, so as to cover the output line $L_O$, a power line L that is extended from the drain electrode $D_L$ of the photosensing unit LS and is broader than the output line $L_O$. This power line L is in turn covered by the protective insulator 5. Further, the output line $L_O$ is coupled to the source electrode $S_L$ via a contact hole provided in the gate insulator 3 but not shown in the drawings.

Thus, being covered above by the power line L, the output line $L_O$ is electrostatically shielded. Thereby, noise, particularly that from directly above the TFT substrate, is blocked out. The output line $L_O$ is formed from the same material and in the same fabrication process as the gate electrode $G_L$, and so as to be integrated therewith. Moreover one end portion of the output line $L_O$ is coupled to the source electrode $S_L$ via the contact hole provided in the gate insulator 3. Also, the power line L is formed from the same material and in the same fabrication process as the source electrode $S_L$ and drain electrode $D_L$, so as to be integrated therewith, being formed as an extension of the drain electrode $D_L$.

In the Fourth Embodiment too, the surface of the photosensing unit LS will preferably be covered by the conductive film (ITO) 6, and also its conductive film (ITO) 6 will preferably be coupled to the power line L via a contact hole not shown in the drawings that is provided in the protective insulator 5, etc.

Above, the invention has been described in detail through the foregoing embodiments. The invention is not limited to these embodiments however, and it will be obvious to those skilled in the art to which the invention pertains that various modifications or variations can be made in the invention without departing from the scope and spirit thereof. For instance, instead of a TFT, another ambient light photosensor such as a photodiode could be used. Also, the actuation circuitry for the TFT ambient light photosensor is not limited to that in FIG. 2A; it could alternatively be circuitry in which, for example, the source electrode $S_L$ is coupled to the standard voltage supply Vref, the drain electrode $D_L$ is coupled to the standard voltage supply Vs, and the capacitor C is charged with the photoelectric current that is output from the TFT ambient light photosensor.

What is claimed is:

1. A liquid crystal display device comprising:
   a liquid crystal display panel in which a liquid crystal layer is provided between an active matrix substrate and an opposed substrate;
   a photosensing unit that is provided on the active matrix substrate and has an ambient light photosensor that senses external light;
   an output line that bears output signals out from the photosensing unit;
   a power line that supplies a constant voltage; and
   an illuminating unit that is controlled via the output of the photosensing unit;
   the ambient light photosensor being covered over by a transparent electrode, with a transparent insulating layer interposed, and the transparent electrode being electrically coupled to the power line.

2. The liquid crystal display device according to claim 1, wherein the ambient light photosensor is constituted of a thin film transistor, and the transparent electrode covers the opposed portions of the thin film transistor's source electrode and drain electrode, viewed from above.

3. The liquid crystal display device according to claim 2, wherein the source electrode and drain electrode are both formed to be shaped like combs, and are disposed so as to mesh into each other with a certain distance intervening.

4. The liquid crystal display device according to claim 2, wherein the surface of the thin film transistor is covered over with a planarization layer while the transparent electrode is formed on the surface of the planarization layer and moreover is electrically coupled to the power line via a contact hole that is provided in the planarization layer and transparent insulating layer.

5. The liquid crystal display device according to claim 1, wherein the output line is covered over by the transparent electrode, or else both the output line and the power line are so covered over, with the transparent insulating layer interposed, and moreover the transparent electrode is electrically coupled to the power line via a contact hole that is formed in the transparent insulating layer.

6. The liquid crystal display device according to claim 5, wherein two power lines are provided in parallel, and the output line is disposed between the two power lines.

7. The liquid crystal display device according to claim 1, wherein a first transparent insulating layer, the output line, a second transparent insulating layer, and the transparent electrode are stacked over the power line in the order given, when viewed from above, in such a manner that the power line, output line and transparent electrode are superposed; and moreover the transparent electrode is electrically coupled to the power line via a contact hole that is formed in the first and second transparent insulating layers.

8. The liquid crystal display device according to claim 7, wherein the widths of the power line and of the transparent electrode, in the direction orthogonal to the lengthwise direction, are larger than the output line's width in the same direction.

9. The liquid crystal display device according to claim 7, wherein the power line is formed from the same material as the gate electrodes of the thin film transistors that are formed on the active matrix substrate and serve as the switching elements for the liquid crystal display panel; the output line is formed from the same material as the source electrodes and drain electrodes of the thin film transistors serving as the switching elements; and the transparent electrode is formed from the same material as the pixel electrodes of the liquid crystal display panel.

10. The liquid crystal display device according to claim 1, wherein the power line is laid over the output line so as to be superposed thereover when viewed from above, with the transparent insulating layer interposed therebetween.

11. The liquid crystal display device according to claim 10, wherein the width of the power line in the direction orthogonal to the lengthwise direction is greater than the output line's width in the same direction.

12. The liquid crystal display device according to claim 10, wherein the output line is formed from the same material as the source electrodes and drain electrodes of the thin film transistors that are formed on the active matrix substrate and serve as the switching elements for the liquid crystal display panel, and the power line is formed from the same material as the pixel electrodes of the liquid crystal display panel.

13. The liquid crystal display device according to claim 10, wherein the output line is formed from the same material as the gate electrodes of the thin film transistors that are formed on the active matrix substrate and serve as the switching elements for the liquid crystal display panel, and the power line is formed from the same material as the source electrodes and drain electrodes of the thin film transistors serving as the switching elements.

14. The liquid crystal display device according to claim 1, wherein the power line and output line are formed simultaneously with the process of fabricating the thin film transistors that are formed on the active matrix substrate and serve as the switching elements for the liquid crystal display panel.

15. The liquid crystal display device according to claim 1, wherein the ambient light photosensor is composed of a thin film transistor and a capacitor.

16. The liquid crystal display device according to claim 15, wherein the thin film transistor's source electrode is coupled to one of the capacitor's electrodes and additionally is coupled to the output line, while the capacitor's other electrode is coupled to the power line.

17. The liquid crystal display device according to claim 16, wherein a particular negative voltage is applied to the thin film transistor's gate electrode; the thin film transistor's source electrode is coupled to one of the capacitor's electrodes and is also coupled to a standard voltage supply via a switching element; and the capacitor is charged by turning on the switching element.

* * * * *